June 11, 1940.  E. B. MALLORY  2,204,093
MECHANICAL AERATOR
Filed May 18, 1938  3 Sheets-Sheet 2

INVENTOR
Edward B. Mallory
BY
Ward Crosby & Neal
ATTORNEYS

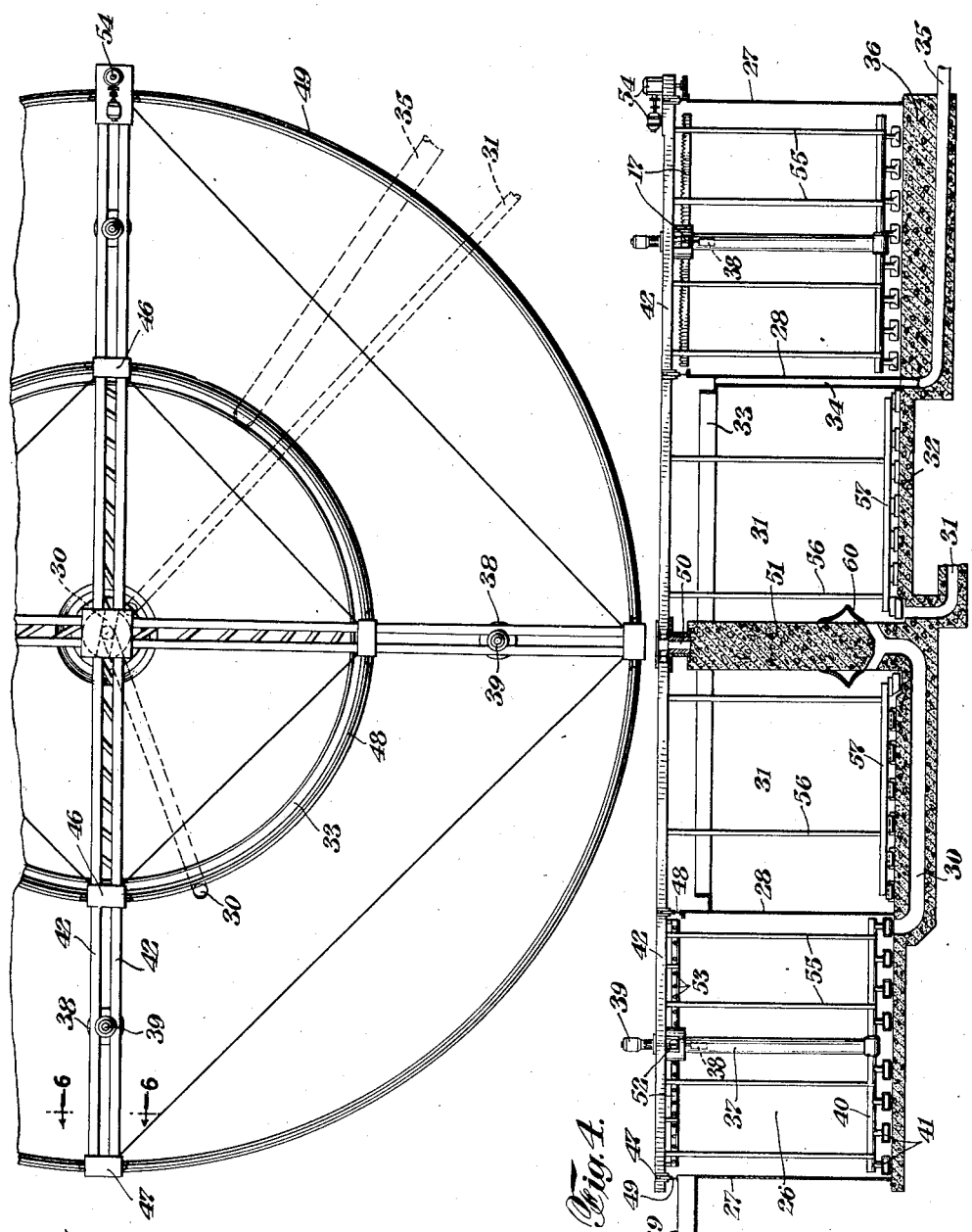

Patented June 11, 1940

2,204,093

UNITED STATES PATENT OFFICE 2,204,093

MECHANICAL AERATOR

Edward B. Mallory, Tenafly, N. J.

Application May 18, 1938, Serial No. 208,527

4 Claims. (Cl. 259—95)

The invention relates to aerators as used in the purification of sewage and analogous waste liquors, for the purpose of oxidizing unstable putrescible components of the sewage to convert them into more stable forms, as well as to intermix the liquid components of the sewage with the solids suspended therein. In waste purification by the activated or oxidized sludge process for example, incoming sewage (after appropriate so-called primary treatment) is fed into the aerator in admixture with sludge particles recirculated back into the system from a previously completed cycle, and the aerator serves to oxygenate the mixed liquor thus constituted and to bring the recirculated sludge particles into contact with the liquid and solid components of the incoming sewage, thereby accelerating the rate of chemical reactions.

The invention also relates particularly to aerators of the type wherein the contents of the aerator are mechanically moved to expose them to the oxygenating action of the surrounding air and to intermix their solid and liquid components, in contrast with aerators of the so-called diffusion type wherein air is bubbled up through the contents of the aerator. Heretofore mechanical aerators of the so-called draft tube type have been of decidedly limited capacity in respect to the volume of waste liquor which could be thereby adequately treated, and one important object of the invention is to provide a mechanical aerator of the last mentioned type which will enable markedly augmented capacity to be obtained in the above respects. From another aspect, the present invention aims to provide such an aerator wherein circulation of the liquor in all portions of the liquor column within the aerating chamber will be positively and directly brought about, thereby to insure completeness and uniformity of treatment throughout the chamber and avoid dead spots in which a reduced rate of the desired chemical reactions might otherwise occur or in which solids might otherwise reside for undesirable periods and become septic, thereby increasing the residual load on the process. The invention has special advantages under conditions of operation wherein it is desired to aerate a heavy mixed liquor, i. e. one containing a high sludge content. Further objects and advantages of the invention will be in part obvious and in part specifically referred to in the description hereinafter contained which, taken in conjunction with the accompanying drawings, discloses certain preferred forms of apparatus operable in accordance with the invention; such apparatus however should be regarded as only illustrative of the invention in its broader aspects. In the drawings—

Fig. 4 is a central vertical section of another form of apparatus constructed to operate in accordance with the invention.

Fig. 5 is a plan view of the apparatus shown in Fig. 4.

Figure 1:
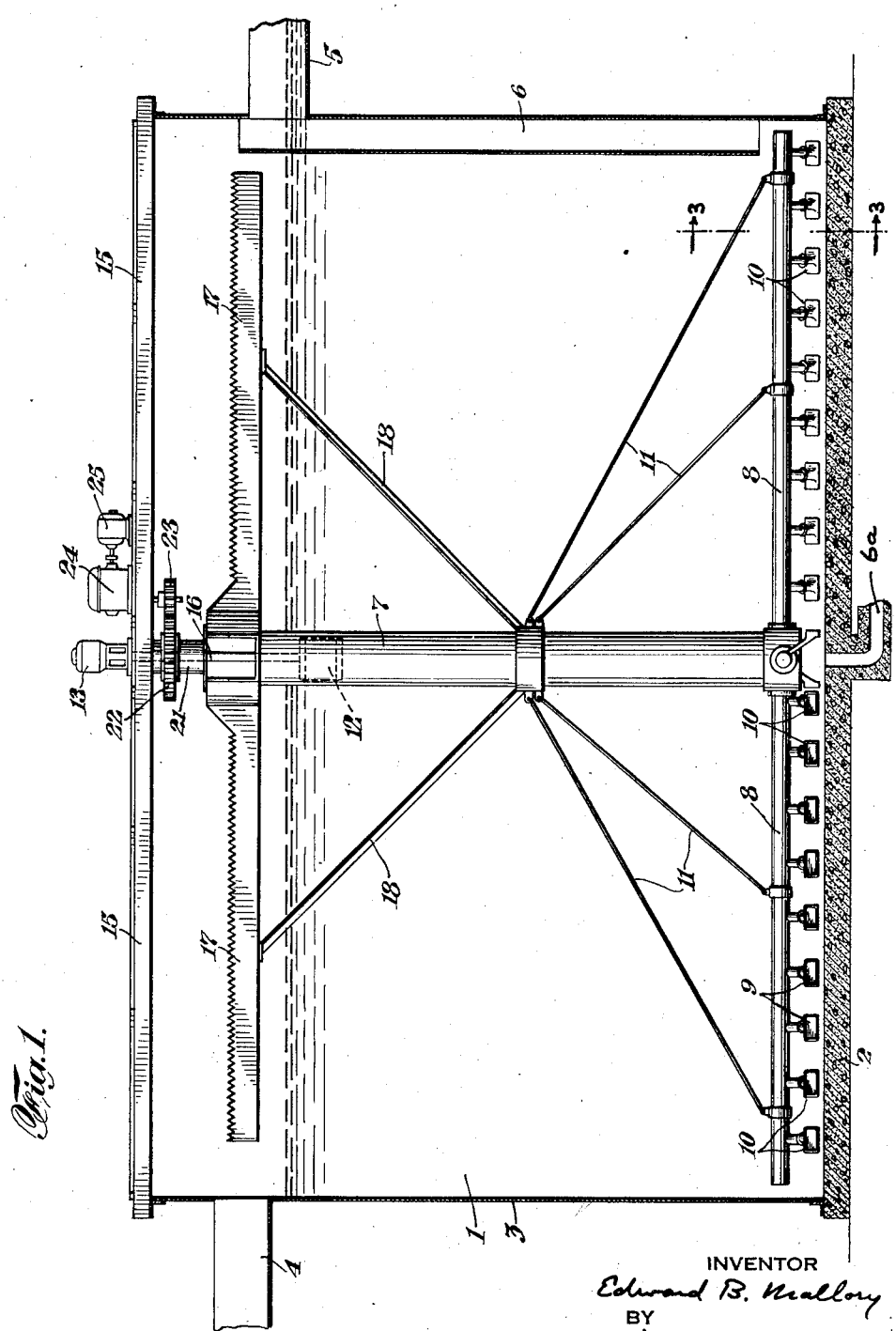
Fig. 1 is a central vertical section showing one form of apparatus constructed to operate in accordance with the invention.
Figure 2:
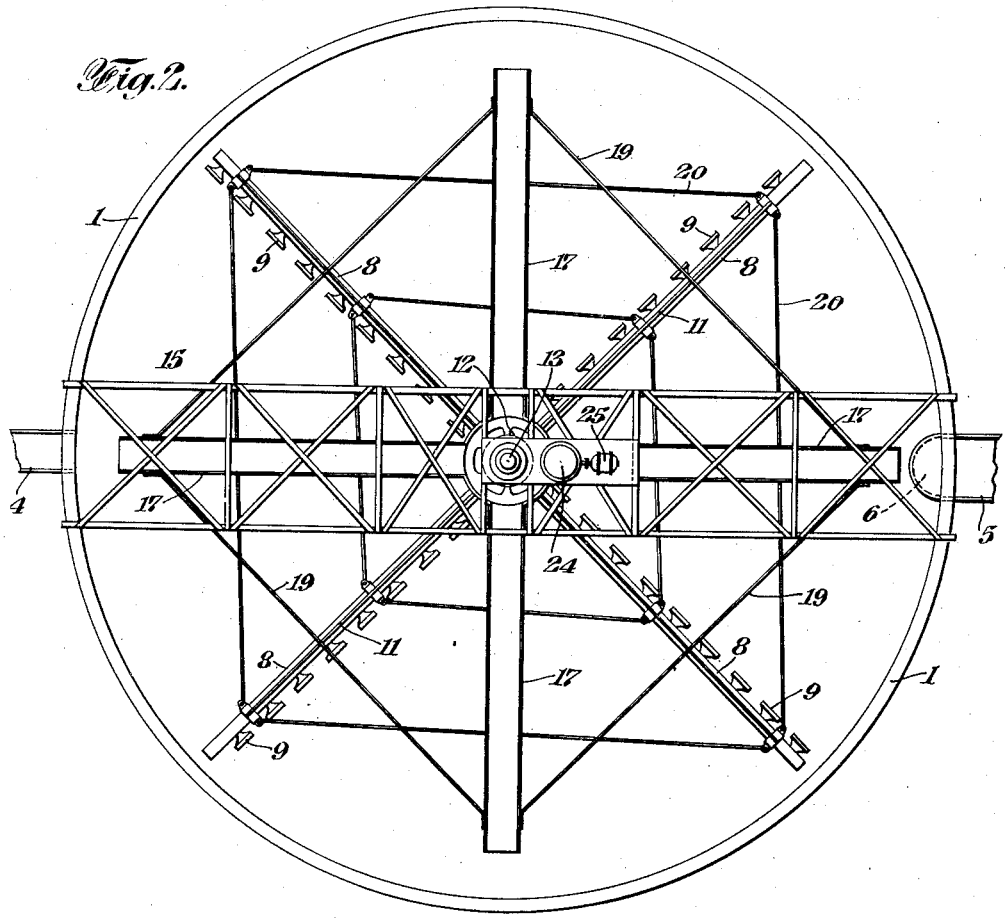
Fig. 2 is a plan view of the apparatus shown in Fig. 1.
Figure 6:
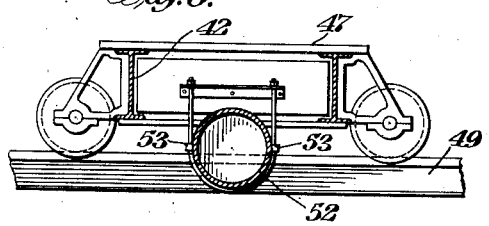
Fig. 6 is a detail section taken on line 6—6 of Fig. 5 looking in the direction of the arrows.
Figure 3:
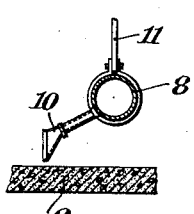
Fig. 3 is a detail section taken on line 3—3 of Fig. 1 looking in the direction of the arrows.

In Figs. 1 to 3 I have illustrated a simple form of aerating apparatus constructed to operate in accordance with the invention and including a chamber 1 having a suitable floor 2 and an enclosing side wall 3 which preferably is substantially circular in cross section. Sewage mixed liquor to be treated may be fed into chamber 1 through a suitable feed conduit 4 and withdrawn from the chamber through an offtake conduit 5 which in the present instance is in communication with the bottom portion of chamber 1 through a vertical passageway 6 adjacent the enclosing side wall 3 of the chamber.

In accordance with the present invention I provide in the chamber 1 an upstanding draft conduit 7 through which mixed liquor in the chamber is caused to circulate, and I employ in connection with such draft conduit, mixed liquor conducting members opening into the bottom portion of chamber 1, at points so spaced about or distributed over the bottom of the chamber, that all portions of the liquor column in the chamber will be served substantially equally and uniformly by the draft conduit and mixed liquor conducting members. The form of the invention shown in Figs. 1 to 3 may be readily arranged either to cause mixed liquor to be drawn into the mixed liquor conducting members from the bottom portion of chamber 1 and circulated upwardly through the draft conduit 7 and discharged into the upper portion of the chamber, or the mode of operation may be such that mixed liquor is drawn from an upper level of chamber 1 into draft conduit 7 and circulated downwardly through the draft conduit and mixed liquor conducting members to be delivered at points distributed over the bottom portion of the chamber. Preferably the mixed liquor conducting members are moved relative to the mixed liquor contained in the bottom portion of the aerating chamber to further augment the uniformity and completeness of treatment. In the form of the invention shown in Figs. 1 to 3 the draft conduit 7 is located substantially in the central vertical axis of chamber 1 and the mixed liquor conducting members above mentioned take the form of radially extending hollow header members or pipes 8 disposed in the bottom portion of the chamber and communicating with draft conduit 7 at their inner ends. These header members 8 are provided with openings 9 spaced across the bottom portion of the chamber, the openings 9 being provided in the present instance in hollow nozzle-like members 10 extending from the headers 8 as shown more in detail in Fig. 3. Headers 8 may be braced in position by suitable tie-rods 11.

In the upper portion of draft conduit 7 I provide a liquid pump indicated generally at 12 in Fig. 1, and which will not be described in detail since suitable forms thereof are known in the art. As shown, this pump is driven by a motor 13 supported on a fixed superstructure 15 overlying the aerating chamber, the motor being connected to the pump by shaft 16. If the pump 12 be assumed to be arranged to draw mixed liquor upwardly through draft conduit 7, the distribution of the openings 9 over the bottom portion of the chamber, will cause the mixed liquor to be drawn into headers 8 from numerous points distributed around the bottom of the chamber, from whence the mixed liquor will pass upwardly through draft conduit 7 and pump 12, from whence it will be suitably distributed over the upper portion of the chamber. As shown in Figs. 1 and 2 the pump 12 delivers into a plurality of radially extending weirs or troughs 17 which overlie the main body of liquid contained within the chamber and cause the circulated mixed liquor to be distributed fairly uniformly over various areas of the tank. These weirs 17 may have suitable braces 18 to assist in holding them in position on draft conduit 7, and tie-rods 19 (Fig. 2) may be used between the several weirs. Similar tie-rods 20 may be used extending between the outer portions of the headers 8.

Preferably the liquid conducting members or headers 8 above described, and their openings 9, are moved relative to the mixed liquor in the bottom portion of chamber 1 so as to serve different zones of the mixed liquor successively and enable substantially uniform treatment to be obtained with a smaller number of liquid conducting members. In the form of the invention shown in Fig. 1 the draft conduit 7 and parts carried thereby, are suspended from the superstructure 15 by a collar 21 which rotatably surrounds shaft 16 but is fixed with respect to draft conduit 7 and associated parts, in such manner that when draft conduit 7 is moved angularly substantially about the central axis of chamber 1, the liquid conducting members and their openings 9 sweep angularly over the floor of the chamber and serve all parts thereof substantially uniformly. The number and size of the openings 9 may be so selected from various radial distances from the axis of rotation, as to draw in larger amounts of mixed liquor from points at greater distances from the axis where larger volumes of mixed liquor should be circulated than is necessary in the central zone.

In the form of the invention under discussion the draft conduit and mixed liquor conducting members are slowly rotated by a gear 22 attached to collar 21, and driven in turn by a pinion 23 and reduction gearing 24 connected to a suitable motor 25, the last mentioned parts being supported by the fixed superstructure 15.

Whether the apparatus be arranged to draw in liquor from the bottom of the tank and discharge it over the top, or vice versa, the mixed liquor conducting members 8 and their openings 9 being distributed over the bottom portion of chamber 1 as above described, will positively and directly cause mixed liquor to be substantially uniformly withdrawn from or conducted to the various areas of the bottom of the tank, overcoming the tendency which the sludge particles otherwise would have to become quiescent and settle out in local areas at the bottom of the chamber. The uniform and complete circulation obtained as above described is highly important in intermixing all of the solid particles thoroughly with the liquid components of the liquor, and in insuring adequate exposure of all portions of the mixed liquor to the oxygenating effect of the air into contact with which the mixed liquor passes during part of the circulation cycle. The apparatus also enables much heavier mixed liquors to be treated (that is containing higher sludge content) as compared to prior circulating draft pipe arangements wherein the natural drift of the sludge particles was relied upon to keep them in the circulating streams. With these prior arrangements only light mixed liquors could be treated, otherwise some of the sludge would settle out at local points and become septic, a difficulty which is avoided by the above mentioned direct and positive circulation obtained at substantially all points over the bottom of the chamber. Accelerated rates of purification and increased rates of decolorization of trade wastes for example may be obtained by employing mixed liquors of high suspended solids concentration. In prior aerators of the so-called draft tube type mixed liquors having suspended solids concentration higher than about 2000 to 2500 p. p. m. could not be used, whereas with apparatus constructed in accordance with the present invention mixed liquors having a suspended solids concentration from 4000 to 5000 p. p. m. may be employed where the sewage or waste characteristics make this high range of concentration desirable. When heavy concentrated mixed liquors are treated in an aerator of the diffusion type, substantial quantities of the suspended solids adhere to the rough surfaces of the porous diffusers and slowly cause clogging and consequent increase in the air pressure required to force proper amounts of air through the diffuser, thereby increasing operating costs and requiring cleaning of the diffusers from time to time. Apparatus constructed in accordance with the present invention is free from these difficulties.

In the past it has been the general practice in the art to employ mechanical aerators of the draft tube type only in plants of relatively small capacity. This was necessarily so because of the great multiplicity of tanks which would be required for a larger installation, each individual aerator being limited in size because of the difficulty of keeping all portions of the aerator contents adequately in circulation if a tank of large dimensions should be employed. In accordance with the present invention the direct and positive circulation to different parts of the tank, also the movability of the liquid conducting members with respect to the contents of the tank, enable adequate and uniform treatment to be obtained with an aerator of much increased capacity.

Figs. 4 to 7 show the invention as carried out by an apparatus somewhat differently constructed, wherein an aerating chamber 26 is defined by an outer enclosing side wall 27 and an inner side wall 28, which walls preferably are substantially circular in shape and symmetrically disposed about a common central axis. Mixed liquor may be fed into chamber 26 through an intake conduit 29 and withdrawn therefrom through conduit 30 which in the present instance conducts the aerated mixed liquor into a clarifer or settling chamber 31 concentric with aerating chamber 26. In the settling chamber 31 the solids will settle out to form a sludge blanket in the bottom of the settling chamber, and sludge may be withdrawn through a discharge passageway 31 leading through the bottom wall 32 of the clarifier, for recirculation into the aerating chamber along with incoming sewage, and for disposal. Clarified effluent may flow out from clarifier chamber 31 over an annular weir 33 and down through a duct 34 adjacent wall 28 to discharge conduit 35 passing under the floor 36 of aerating chamber 26 to the receiving waters of the region.

In the form of the invention shown in Figs. 4 and 5 a plurality of draft conduits 37 having pumps 38 with driving motors 39, mixed liquor conducting members 40 with openings 41 (generally similar respectively to the members 7, 12, 13, 8 and 9 previously described in connection with Figs. 1 and 2) are provided, and are mounted so as to be angularly movable about the central axis of the annular aerating chamber 26. For supporting and moving the draft conduits 37, a rotary supporting structure overlying the chambers 26 and 31 may be used, this structure being shown as having I-beams 42 assembled into the fan-shaped form shown in Fig. 5 and journaled on trucks 46 and 47 provided with wheels running on rails 48 and 49 carried respectively by the side walls 28 and 27. As shown in Fig. 4 the supporting structure may also have a central support and bearing 50 carried by a supporting pillar 51 located at the central axis of the apparatus. In the construction shown more in detail in Fig. 6, the pumps 38 deliver into mixed liquor distributing members 52 shown in the form of pipes suitably suspended from the overlying supporting structure and provided with nozzles 53 through which the mixed liquor is sprayed onto the upper portion of aerating chamber 26.

In the form of the invention now under discussion the pumps 38 draw mixed liquor from the bottom portion of chamber 26 through the openings 41 respectively associated therewith, and the mixed liquor conducting members 40 extend substantially all the way across chamber 26 so that as the overhead supporting structure is rotated (which may be done by a suitable motor and gearing as indicated generally at 54) the several sets of openings 41 are carried progressively around over floor 36 of chamber 26, in such manner as to serve all portions of the chamber directly and uniformly as rotation continues. At the same time the mixed liquor distributing members 52 are likewise carried around to distribute the mixed liquor so drawn up through the several draft conduits 37 progressively over different parts of the aerating chamber. Thus the uniformity and completeness of treatment is augmented by moving the draft conduits 37 themselves bodily in addition to the mixed liquor distributing members 52, with respect to the contents of the aerating chamber. The mixed liquor conducting members 40 may be held in position by the aid of uprights 55 extending between them and the beams 42 above mentioned.

In the operation of the invention as carried out by either of the forms of apparatus above described, the rate of aeration may be governed in accordance with the load on the plant (measured in terms of B. O. D. concentration) by suitably varying the rate of flow through the draft conduits, for example by the use of variable speed driving motors or by suitable valve arrangements used in conjunction with the pumps, or by slowing down or entirely stopping some of the pumps. In previous aeration plants involving draft tubes, the capacity of the aerators being necessarily limited as above described, a number of tanks in series were necessary to accommodate sizable loads, and should one of the motors or pumps become disabled for any reason, the entire volume of liquid in the corresponding tank would no longer receive treatment, and unless the condition were promptly corrected the sludge would settle out of the mixed liquor in that particular tank and become septic, thus greatly adding to the load on the plant and decreasing purification obtained. In the form of apparatus last above described this objection is obviated since if one of the pumps should go out of service the remaining units will still be moved progressively to treat the entire body of liquid in the tank, preventing the sludge from settling out or becoming septic.

As shown the beams 42 also carry uprights 56 located in the clarifier 31, and carrying sludge collecting members denoted generally at 57 which assist in removing sludge from the blanket which is formed in the bottom of the clarifier chamber. These members 57 should be regarded as merely typical of mechanism for assisting in the removal of the sludge, several forms of which mechanism are known in the art. In most instances the efficiency of the sludge collecting members is increased by moving them angularly as above described.

Figure 7:
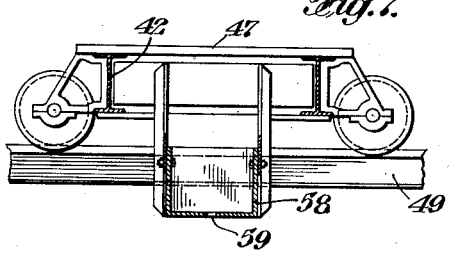
Fig. 7 is a view similar to Fig. 6 but showing a somewhat modified construction.

Fig. 7 shows a somewhat modified construction wherein troughs 58 are employed as substitutes for the distributor pipes 52 to receive the mixed liquor drawn up through draft conduits 37 and discharged by pumps 38, these troughs 58 being shown in Fig. 7 as being provided with holes 59 through which the mixed liquor may pass to the upper portion of chamber 26. These troughs 58 may be likewise supported by and movable with the overhead supporting structure above referred to. The rate of oxygenation of the liquids in the aerating chamber is accelerated by agitating the surface of the liquid in the tank, or by spraying or allowing to fall through the air in relatively small masses, the mixed liquor drawn up from the bottom of the tank in the case of the upward flow draft conduits above described. Similar devices for agitating and exposing the contents of the aerating chamber to the air, are advantageous in installations in which the mixed liquor flows downwardly through the draft conduit or conduits.

While the invention has been disclosed as carried out by apparatus of certain particular constructions, it should be understood that many changes may be made therein without departing from the scope of the invention in its broader aspects, within the scope of the appended claims.

I claim:

1. A mechanical aerator of the class described including a chamber having outer and inner walls disposed substantially symmetrically about a central axis, means for feeding mixed liquor into said chamber and for withdrawing mixed liquor therefrom, an upwardly extending draft conduit disposed in said chamber, means for circulating mixed liquor through said conduit, mixed liquor conducting members communicating with said draft conduit and having openings communicating with the bottom portion of said chamber at points spaced between said walls, means for moving said draft conduit and liquid conducting members angularly substantially about said central axis to cause the aforesaid openings of said liquid conducting members to travel through the bottom portion of said chamber, and means affording passage of mixed liquor between the upper portion of said draft conduit and the upper portion of said chamber.

2. A mechanical aerator of the class described including a chamber having outer and inner walls disposed substantially symmetrically about a central axis, means for feeding mixed liquor into said chamber and for withdrawing mixed liquor therefrom, a supporting structure overlying said chamber, an upwardly extending draft conduit disposed in said chamber, means for circulating mixed liquor through said conduit, said draft conduit and said last mentioned means being carried by said supporting structure, means for moving said supporting structure angularly substantially about said central axis thereby to cause said draft conduit to travel about in said chamber, and mixed liquor conducting members communicating with said draft conduit and having openings communicating with the bottom portion of said chamber at points spaced between said walls, said mixed liquor conducting members being also supported from and movable with said supporting structure.

3. A mechanical aerator of the class described including a chamber, means for feeding mixed liquor into said chamber and for withdrawing mixed liquor therefrom, an upwardly extending draft conduit disposed in said chamber, means for causing mixed liquor to circulate through said draft conduit, mixed liquor conducting members having passageways communicating with said draft conduit and opening into the bottom portion of said chamber at points spaced across the latter, means for moving said draft conduit and said mixed liquor conducting members about within the bottom portion of said chamber, and means affording passage of mixed liquor between the upper portion of said draft conduit and the upper portion of said chamber.

4. A mechanical aerator of the class described including a chamber, means for feeding mixed liquor to said chamber and for withdrawing mixed liquor therefrom, a supporting structure rotatable about an axis which is substantially centrally disposed with respect to said chamber, an upwardly extending draft tube disposed in said chamber and spaced from said axis of rotation, said draft tube having means therein for causing mixed liquor to circulate therethrough, a mixed liquor conducting member communicating with said draft tube and having openings communicating with the bottom portion of said chamber at points variously spaced from said axis of rotation, said draft conduit and mixed liquor conducting member being attached to and rotatable with said supporting structure.

EDWARD B. MALLORY.